Oct. 28, 1952     A. F. DEUTH     2,615,777

ELECTROLYTIC RECORDER WITH SELF-RENEWING ELECTRODE

Filed Aug. 27, 1949

*INVENTOR.*
ALBERT F. DEUTH
BY *Carl V. Olson*

*ATTORNEY*

Patented Oct. 28, 1952

2,615,777

UNITED STATES PATENT OFFICE 2,615,777

ELECTROLYTIC RECORDER WITH SELF-RENEWING ELECTRODE

Albert F. Deuth, Hartsdale, N. Y., assignor to Faximile, Inc., New York, N. Y., a corporation of Delaware Application August 27, 1949, Serial No. 112,675

6 Claims. (Cl. 346—74)

This invention relates to recorders for use with electro-responsive recording mediums, and more particularly to recorders including an electrode which erodes when the recorder is in use.

One of the most successful electrical recording systems involves the passage of electric current from a positive electrode through an electrolytic recording paper such as is described in Patent No. 2,339,267, January 18, 1944, to John V. L. Hogan et al. In the recording process, each elemental edge area of the positive electrode is gradually eroded by an amount roughly proportional to the density of marks thereby created and the duration of time during which marks are made on the paper. This erosion of the marking electrode is also encountered in other recording systems and it becomes especially troublesome when a solid line is made on the paper extending in the direction of paper travel. Eventually, the part of the electrode used to make the line erodes until it no longer properly contacts the paper surface and the electrode must be replaced. It is therefore the general object of this invention to provide a recorder wherein erosion is evenly distributed along the paper-contacting edge of the electrode.

It is another object of this invention to provide a recorder which may be operated under difficult recording conditions for long periods of time without replacing the eroding electrode.

While not limited thereto, the invention is particularly useful in the field of geophysical exploration for recording variable-density lines corresponding to reflection signals received at various distances from an explosion point. Photographic recorders have been used for this purpose, but they are necessarily expensive and troublesome to use because photographic film is expensive and requires chemical developing. It is therefore a further object of this invention to provide a device for recording variable-density lines on a relatively inexpensive electrolytic recording paper.

Pursuant to these and other objects which will be apparent to those skilled in the art, the ends of a linear tape or wire electrode are wound on spaced reels and means are provided for winding the electrode from one reel to the other. The position of the portion of the electrode between the reels may be fixed by a guide through which the electrode passes. Means are provided for continuously drawing electrolytic recording paper from a supply roll over and in contact with the portion of the electrode between the reels. Resilient stationary electrodes are disposed to cooperate with the tape or wire electrode by contacting the recording paper on the opposite side therefrom.

For a better understanding of the invention, reference is had to the following description taken in conjunction with the appended drawings wherein.

Figure 1:
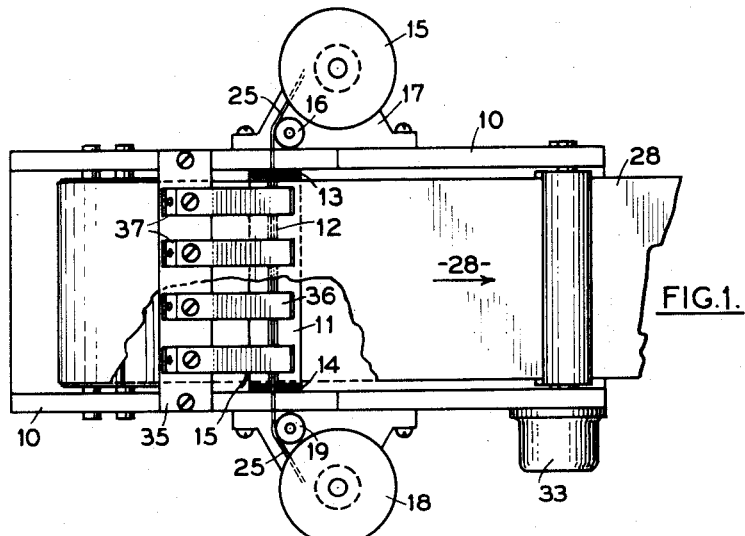
Fig. 1 is a plan view of a recorder constructed according to the teaching of this invention, part of the recording paper being broken away to reveal the tape and guide construction thereunder.
Figure 2:
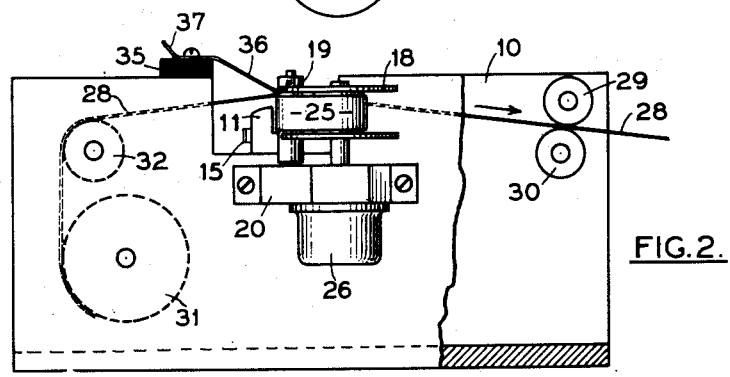
Fig. 2 is a side elevation of the recorder shown in Fig. 1 with part of the frame broken away.

Referring now in greater detail to the drawings, a channel shaped frame 10 supports a transversely extending guide 11 provided on its top edge with a longitudinal slot 12. The guide 11 may be insulated from the frame 10 by means of insulators 13 and 14 and may be provided with an electrical connection lug 15.

A supply reel 15 and positioning idler 16 are journalled in a bracket 17 secured to one side of the frame, and a takeup reel 18 and positioning idler 19 are journalled in a bracket 20 secured to the other side of frame 10. A metallic flexible tape electrode 25 has an intermediate portion slidably disposed in slot 12 of guide 11, and has one end wound on supply reel 15 and its other end wound on takeup reel 18. Idlers 16 and 19 properly position tape 25 regardless of the amount of tape on the reels.

A gearmotor 26 mounted on bracket 20 rotates takeup reel 18 at an appropriately low speed. It will be understood that when the tape 25 has been wound on takeup reel 18, the latter and the supply reel 15 may be transposed, or the reel 15 may be driven as a takeup reel, for the purpose of reusing the tape 25.

The term "guide" as used in the appended claims is intended to cover not only the guide 11 and positioning idlers 15 and 18 but also mechanical equivalents thereof. It will be understood that under some circumstances, the guide 11 or the idlers 15 and 18 may be dispensed with.

Electro-responsive recording paper 28 is drawn by feed rolls 29 and 30 from paper supply roll 31, over idler roll 32 and over the top edge of a portion of tape electrode 25 between reels 15 and 18. One (or both) of feed rolls 29 and 30 is rotated by a gearmotor 33 mounted on frame 10. While separate gearmotors 26 and 33 have been shown, they may of course be replaced by a single motor and appropriate gearing.

A cross bar 35 of insulating material supports a plurality of resilient metallic electrodes 36 disposed to cooperate with the tape electrode 25 by contacting paper 28 on the side opposite therefrom. Electrodes 36 are formed and mounted so that they exert a constant pressure on paper 28 to provide good electrical contact therewith. The ends 37 of electrodes 36 are adapted for electrical connection with separate sources of signals to be recorded. The electrodes 36 may have a relatively wide dimension contacting the paper 28, as shown in the figures, for recording lines of varying density, the density at any point along the line corresponding to the strength of signal applied to the electrode at a given time. Wide lines of varying density in the direction of the lines are easier to interpret than narrow lines. On the other hand, for some applications, electrodes 36 may be made with paper-contacting widths comparable to the thickness of tape 25.

Figure 3:
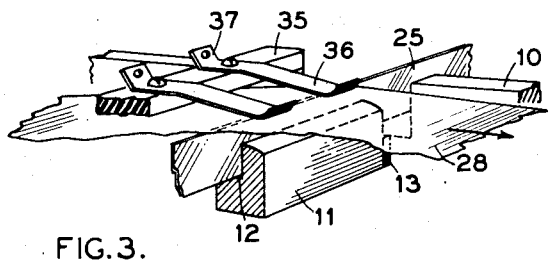
Fig. 3 is a fragmentary perspective view showing the cooperation of the tape electrode, guide, recording paper and resilient electrodes.
Figure 4:
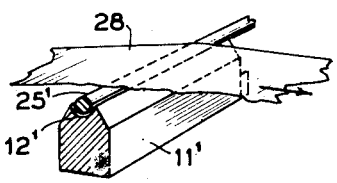
Fig. 4 is a perspective view corresponding in part to Fig. 3 but illustrating another embodiment of linear electrode and guide for use in place of the tape electrode and guide of Figs. 1 through 3.

Fig. 4 shows an alternative form of guide 11' provided with a slot 12' in which a wire electrode 25' is free to slide. As is apparent from a comparison of Fig. 4 with Fig. 3, the wire electrode 25' serves the same purpose as the tape electrode 25.

In operation, the outputs of a plurality of signal sources are connected across the electrodes 36 and tape 25 by connecting one output terminal of each source to a corresponding electrode 36, and the other output terminal of each source to lug 15 on guide 11, the latter being in electrical contact with tape 25. In the alternative insulators 13 and 14 may be dispensed with and electrical connection made from one output terminal of each source to the tape 25 through frame 10 or directly to an end of tape 25. The signal currents flow from the tape electrode 25 through paper 28 to resilient electrodes 36, the current flow causing marks to appear on the moving paper 28. It is apparent that erosion of the edge of tape electrode 25 contacting paper 28 is distributed evenly along the length of the electrode by reason of its movement at right angles to the paper movement and direction of recorded lines.

While a form of the invention has been shown and described in some detail it will be understood that this has been done by way of illustration only and that the scope of the invention is not to be limited thereby.

What is claimed is:

1. A recorder for use with an electro-responsive recording medium, comprising: a linear flexible electrode and means including reels engaging the ends of said electrode for continuously moving the electrode in one direction along its length, means for drawing the recording medium substantially at right angles across and in contact with the linear electrode, and a second electrode disposed to contact the other side of the recording medium.

2. A recorder for use with an electro-responsive recording medium, comprising: an elongated flexible electrode, a guide for a portion of the electrode, supply and takeup reels disposed at opposite ends of the guide and engaged with opposite ends of the electrode, means for rotating the takeup reel to draw the electrode through the guide, means for drawing the recording medium substantially at right angles across and in contact with the portion of the electrode in the guide, and a second electrode disposed to contact the recording medium on the side opposite from the elongated electrode, whereby erosion of the elongated electrode is distributed substantially along its entire length.

3. In a recorder for use with an electro-responsive recording medium, an electrode assembly comprising: an elongated flexible electrode, a guide receptive to a portion of the electrode and permitting longitudinal movement of the electrode therein, reels engaging the ends of the electrode, and means for rotating at least one reel, whereby the electrode is unwound from one reel, drawn through the guide and wound on the other reel.

4. In a recorder for use with an electro-responsive recording medium, an electrode assembly comprising: an elongated flexible electrode, a supply reel engaging one end of the electrode and a takeup reel engaging the other end of the electrode, the reels being in spaced relationship so that the portion of the electrode therebetween is adapted for contact with the recording medium, and means for rotating the takeup reel, whereby erosion of the electrode is distributed substantially along its entire length.

5. A recorder for use with an electro-responsive recording medium, comprising a linear flexible electrode having opposite ends engaged on supply means and takeup means respectively for continuously moving the electrode in only one direction along its length, means for moving the recording medium in contact with the linear electrode, and a second electrode disposed to contact the other side of the recording medium.

6. In a recorder for use with an electro-responsive recording medium, an electrode assembly comprising an elongated flexible electrode having opposite ends engaged on supply means and takeup means respectively for continuously moving the electrode in only one direction along its length from substantially one end to the other of said electrode in contact with said recording medium.

ALBERT F. DEUTH.

REFERENCES CITED

The following references are of record in the file of this patent:

UNITED STATES PATENTS

| Number | Name | Date |
| --- | --- | --- |
| 2,384,515 | Wise | Sept. 11, 1945 |
| 2,437,242 | Cole et al. | Mar. 9, 1948 |
| 2,505,779 | Long | May 2, 1950 |